E. T. FORD.
Potato Digger.
No. 44,716.
Patented Oct. 18, 1864.
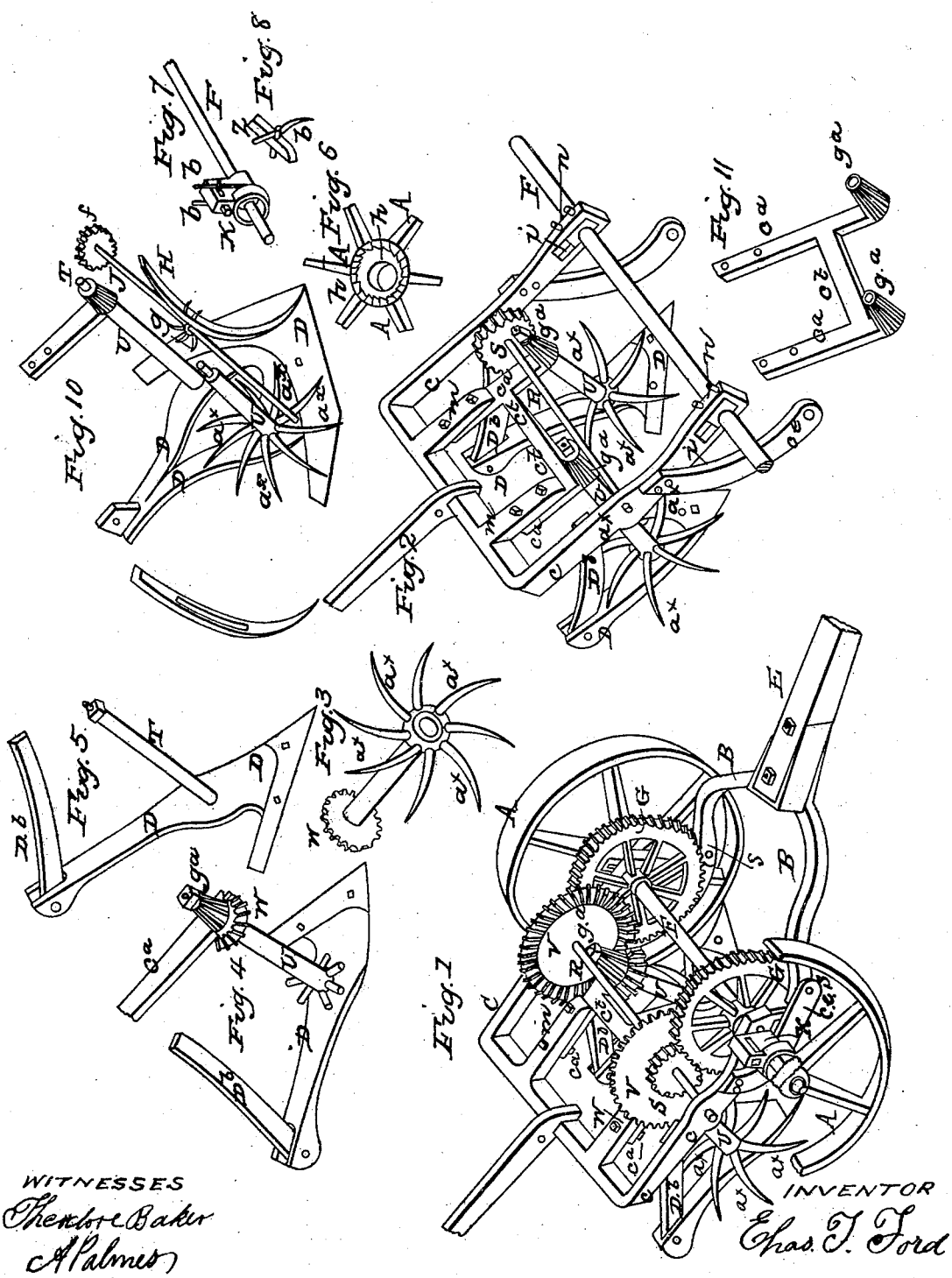
WITNESSES
Theodore Baker
A. Palmer
INVENTOR
Chas. T. Ford

UNITED STATES PATENT OFFICE.

ELIAS T. FORD, OF STILLWATER, NEW YORK.

IMPROVED POTATO-DIGGER.

Specification forming part of Letters Patent No. 44,716, dated October 18, 1864; antedated October 11, 1864.

*To all whom it may concern:*

Be it known that I, ELIAS T. FORD, of the town of Stillwater, county of Saratoga and State of New York, have invented new and useful Improvements in a Machine used for Digging Potatoes; and I do hereby declare that the following is a full, clear, and exact description of the construction and operation of the same, reference being had to the accompanying drawings, making a part of this specification, in which—

Figure 1 is a side perspective view of the machine as arranged with the rotating teeth *ax ax*, forming wheels upon plows located one behind the other, and with a portion of the right drive-wheel A left off, showing parts more clearly. Fig. 2 are detached sections without the drivers, presenting the frame C C *ce ce ca ca ct*, dividers D D, arms D*b* D*b*, shaft R, with one pinion, S, tubes U U, with teeth *ax ax ax*, center shafts, T T, main axle F. Fig. 10 illustrates the divider D as a whole, and the centers T T put upon a line with each other, and with colter H, pinion *f*, shaft J, vine-cutters *g g*. Figs. 3, 4, 5, 6, 7, 8, 9, 11 are also detached sections of Fig. 1, illustrating certain parts more distinctly, like letters referring to like parts in all the drawings.

To enable others skilled in the art to make and use my invention, I will proceed to describe its construction and operation.

*Construction of Fig. 2.*—I take the tube U, with teeth *ax ax* and bevel-pinion W, and insert it upon the center T, as seen in Figs. 3 and 5. I now take the right and left dividers, D D, as seen in Figs. 4 and 5, and locate them underneath the frame C C, allowing the centers T T to enter the tubes *ga ga* of short frame *ca ct*, as seen in Fig. 11, and bolting the short frame *ca* to the center arms of main frame C C, and a further connection of the dividers D D is effected to frame C C by the curved bars D*b* D*b* at the rear. The centers are retained to the dividers D D and frame *ca ca ct* by nuts top and bottom, as seen in Figs. 4 and 1, or other equivalents. The right and left pole-sections, *ce ce* are connected to the right and left extremities of frame C C in rear of the main axle F, and so curved as to pass underneath the axle F and extending to the front, so as to connect the yoke or pole sections B B to frame *ce* C by bolts or one rod. The front extremities of frame C C are opened, forming an elongated mortise, *i*, for the reception of the main axle F, and held within the same by boxes with pins *n* passing through both, so that the axle with drive-gears G G, as seen in Fig. 1, may be connected or disconnected with the multiplying-pinion S S, located upon shaft R. The multiplying-shaft R, as seen in Fig. 2, with the left pinion S, is located upon the frame C C between the centers T T, as seen in Fig. 1, with the right pinion S, bevel-gear V, and left bevel-gear V inserted, and the bevel-gear V V meshing into the smaller bevel-pinions W W, located upon the tubes U U, with the teeth *ax ax ax ax* cast within the lower extremities of the same tubes U U. Fig. 1 also represents the drive-gears G G located upon the main axle F inside and next to the upper extremities of frame C C.

Fig. 7 represents the clutch K, with a sectional part of main axle F, and the springs *b b*, with slide Z, as also seen in Fig. 8. The slide is inserted within the elongated mortise of clutch K, and another narrow elongated mortise is cut within or through the former mortise of clutch K for the reception of the pin passing through the slide Z, as seen in Fig. 8. Detached from clutch K, the pin is put in after the slide P is located. The lower portion of spring *b* is attached to the clutch K, and so placed as to take bearing upon the pin of slide Z, thereby pressing out the slide Z and causing it to come in contact with the ratchet *h*, formed with the drive-wheels A A, as arranged upon the main axle F, one clutch of which may be seen in Fig. 1 without the spring *b*. The clutch K is so formed as to receive the hub of drive-wheel A, as seen in Fig. 7, and the projection of hub, as seen in Fig. 6. The clutch K, as seen in Fig. 7, is in a right position to be inserted upon the right portion of the axle F, as seen in Fig. 1, located between the right prong of frame C and right drive-wheel A. A left clutch may be located in the same place upon the left portion of axle F, so that as the drivers A A are inserted upon the right and left extremities of axle F the ratchets *h h* come in contact with the slides Z of clutch K. The clutch K is made rigid, together with the drive-gear G G, upon the axle F; but the drive-wheels A A are not rigid, only as they come in contact with the clutch K, in which case they both revolve, as contemplated and arranged in Fig. 1. The yoke B B or pole-section is hinged to the front and lower extremities of the sectional parts C*e* C*e* of frame C C below and front of the main axle F at the points S S.

Fig. 10 represents the divider D as a whole with the colter H attached at the front, and the colter H is so curved as to elevate the vines as they come in contact with the rotary cutters *g g* which are attached to the circular plate, and the plate being inserted upon the shaft J with the drive-pinion *f*. The colter H, as seen in Fig. 9, has a slot cut within the same, through which the rotary cutters or knives *g g* move and cut the potato-vines in effect similar to that of the guards and knives used in cutting grass or grain with harvesting-machines. The divider D with its parts, as seen in Fig. 10, may be arranged underneath the frame C C *ca ca ct* similar to that as seen in Figs. 2 and 1, and the drive-shaft J, with pinion *f*, is connected to the right and left prongs of frame C C by hangers, and so arranged that the pinion *f* can mesh within one of the multiplying bevel and spur gear V, the shaft J being below the bevel-pinions W W and larger gear V V. The colter may be extended upward and so curved as to embrace the main axle F, effecting a support to the divider D with frame C C and centers T T. The divider D D, as seen in Fig. 10, is formed with a right and left share, *hr hr*, and formed to correspond with the under surface of the circle described by the revolution of the teeth *ax ax ax ax* of tubes U U. The cogs of the larger spur and bevel gear V V, with the bevel-pinions W W, are so formed as to verge two inches or more from the centers of each, so that the castings from the same patterns being arranged as seen in Fig. 1 allow the tubes U U, with dividers D D, to be placed one in rear and the other in front of the shaft R, as before mentioned.

Fig. 11 represents smaller frame *ca ca ct*, with the elevated tubes *ga ga* formed for the reception and support of the centers T T, as also seen in Figs. 2 and 1.

Operation: As the drivers A A are moved each the motion is communicated to the tubes U U and teeth *ax ax* by the ratchet *h* receiving the slide Z of clutch K, which is fastened to axle F, and moving the drive-gear G G, which is also fastened to axle F, and the gear G G connected to the pinions S S, thereby moving the larger bevel and spur gear V V with multiplying-shaft R, and the gear V V meshing into the bevel-gear W W, which is inserted upon each tube U U, thereby revolving the tubes U U with the teeth *ax ax*, and the motion of the wheels composed of the teeth *ax ax ax ax* are from the outside to the center of dividers D D, and as each divider D cuts underneath the hill of potatoes the mass comes in contact with the rotary teeth of each tube U U, elevating alternately the potatoes from the earth, for the tubes U U with the teeth *ax ax ax ax* are not set upon a line with the multiplying-shaft R, as seen in Fig. 1, in order to avoid pressure at the center of each wheel, which would occur with the inward movement of the teeth *ax ax;* but the tubes U U and centers T T, as seen in Fig. 10, are set upon a line with each other, for the wheels composed of the teeth *ax ax* are moved from center to right and left, and this reverse motion is effected by changing the larger bevel-gear V V upon the multiplying-shaft R, so that they each occupy the opposite side of bevel-gear W W from that as seen in Fig. 1. Further operation of Fig. 10: The pinion *f*, shaft J, and cutters or knives *g g* are made to revolve. The slot of colter H, as also seen in Fig. 9, receives the knives *g g*, which move downward, as arranged, in rear of the colter H, cutting the potato-vines as they are elevated upon the colter H. The colter H is inclined from the front point of divider D and extending upward, and may be so curved as to embrace the main axle F, thereby giving firmness to the divider D, in connection with the centers T T, being attached to the sections *ca ca ct* of frame C C, as may be arranged. The two dividers D D, as seen in Figs. 4 and 5, may have detached points or cutters as well as the divider D as seen in Fig. 10, which may be supplied with new when worn dull. The colter H and cutters or knives *g g* are not used with the arrangement as seen in Figs. 1 or 2. The arrangement as seen in Fig. 10 is to divide the hills of the potatoes with vines when arranged with the frame C C and other parts; but the arrangement as seen and described in Fig. 1 with the detached sections is to take up the hill bodily, passing it at the center, and separating the potatoes wholly or in part from the dirt or earth. The machine can be put into and out of motion by changing the springs *b b* upon the opposite sides of the pins passing through the slides Z Z or slide Z of clutch K, as seen in Figs. 8 and 7. Consequently the slide Z is removed from the ratchet *h* of drive-wheel A, and the drive-wheel A is permitted to revolve upon the extremity of axle F, and not turning the axle F with the other parts. The clutch K, with ratchet *h*, is used to connect the axle F to the driver A in connection with the other, as drivers moving the gear and teeth *ax ax ax ax*, as well as allowing the free movement of one or both wheels A A in turning the machine around or moving in a circle. The yoke B B is hinged to the sections *ce ce* at the point S S, so that the draft will come more directly upon the dividers D D, and causing the dividers to hang more perfectly to the earth.

What I claim, and desire to secure by Letters Patent, is—

1. The combination and arrangement of the two wheels formed with tubes U U, curved teeth *ax ax ax ax*, rotating upon the centers T T, nearly horizontal upon the dividers D D, or divider D, and being upon the angle in entering the ground as a whole; also the centers T T, tubes U U, dividers D D, or divider D, with or without the colter H, shaft J, knives *g g*, pinion *f;* also frame C C, sections of frame *ce ce ca ca ct*, and bars D*b* D*b*.

2. The arrangement of the gear G G upon axle F, bevel-gear V V, shaft R, bevel-pinion W W, pinions S S, yoke B B, hinged to the sections *ce ce* in front and below the axle F, in combination with the clutch K, ratchet *h*, slide Z, spring *b*, or springs *b b*, and drive-wheels A A, as and for the purpose above described.

ELIAS T. FORD.

Witnesses:
   A. PALMER,
   THEODORE BAKER.